(12) United States Patent
Han et al.

(10) Patent No.: US 9,054,359 B2
(45) Date of Patent: Jun. 9, 2015

(54) BATTERY PACK HAVING A BUS BAR PROTECTION UNIT

(75) Inventors: Jung-Yup Han, Yongin-Si (KR); No-Hyun Kwag, Yongin-Si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 334 days.

(21) Appl. No.: 12/955,756

(22) Filed: Nov. 29, 2010

(65) Prior Publication Data

US 2011/0104555 A1 May 5, 2011

(30) Foreign Application Priority Data

Nov. 30, 2009 (KR) .................. 10-2009-0117077

(51) Int. Cl.
*H01M 2/34* (2006.01)
*H01M 2/10* (2006.01)
*H01M 2/20* (2006.01)

(52) U.S. Cl.
CPC ............ *H01M 2/1077* (2013.01); *H01M 2/206* (2013.01)

(58) Field of Classification Search
CPC ...................................... H01M 2/202
USPC ........................... 429/65, 158–160
See application file for complete search history.

(56) References Cited

U.S. PATENT DOCUMENTS

| 6,521,372 | B2* | 2/2003 | Urry ............................ 429/159 |
| 7,108,943 | B2 | 9/2006 | Yamakawa et al. |
| 2006/0178051 | A1 | 8/2006 | Hashida et al. |
| 2007/0054561 | A1* | 3/2007 | Gutman et al. ............. 439/656 |
| 2009/0123820 | A1* | 5/2009 | Han .............................. 429/121 |

FOREIGN PATENT DOCUMENTS

| JP | 2004-119187 A | 4/2004 |
| JP | 2008-166008 A | 7/2008 |
| KR | 10-2007-0080871 A | 8/2007 |
| KR | 10-2009-0000301 A | 1/2009 |
| WO | WO 2006/052063 A1 | 5/2006 |

* cited by examiner

*Primary Examiner* — Jonathan G Leong
(74) *Attorney, Agent, or Firm* — Knobbe Martens Olson & Bear LLP (57) ABSTRACT

A battery pack includes a plurality of battery units, each comprising a plurality of battery cells, a case providing a space to accommodate the battery cells, and a plurality of electrode terminals that are electrically connected to the battery cells and protrude out of the case. Bus bars connect electrode terminals of adjacent battery units. Short circuits are prevented by surrounding each bus bar with an insulating protection unit.

14 Claims, 6 Drawing Sheets

BATTERY PACK HAVING A BUS BAR PROTECTION UNIT

CROSS-REFERENCE TO RELATED APPLICATIONS

This application claims the benefit of Korean Application No. 10-2009-0117077, filed Nov. 30, 2009, in the Korean Intellectual Property Office, the disclosure of which is incorporated herein by reference.

BACKGROUND

1. Field

One or more embodiments of the present invention relate to a battery pack having improved safety by protecting a bus bar that electrically connects a plurality of battery units.

2. Description of the Related Art

In general, unlike primary batteries, which are not chargeable, secondary batteries are chargeable and dischargeable. Secondary batteries are used as energy sources of small-sized mobile devices such as mobile devices and notebook computers, electric vehicles, hybrid electric vehicles, electric bicycles, uninterruptible power supplies, etc. A lithium secondary battery is mainly used as a second battery.

Typically, small-sized mobile devices use several battery cells that are connected in series or in parallel. On the other hand, large-sized devices such as electric vehicles, hybrid electric vehicle, electric bicycles, and uninterruptible power supplies use a battery having a high power output and a large capacity. Thus, large-sized devices use a battery pack including a plurality of battery units. In this case, a plurality of battery cells are accommodated in each battery unit, and the battery units are connected to each other through a connection element such as a bus bar.

In a typical battery pack, voltages and currents are applied and supplied through a bus bar. Thus, there is a need to ensure safety by preventing electrical accidents such as short circuits and undesired electrical contact due to negligence or mishap by insulating the bus bar from the outside.

SUMMARY OF CERTAIN INVENTIVE ASPECTS

One or more embodiments of the present invention include a battery pack having improved safety by including an insulating protection unit on a bus bar that electrically connects adjacent ones of a plurality of battery units.

Additional aspects will be set forth in part in the description which follows and, in part, will be apparent from the description, or may be learned by practice of the presented embodiments.

According to one or more embodiments of the present invention, a battery pack includes a plurality of battery units, each including a plurality of battery cells, a case providing a space for accommodating the battery cells, and a plurality of electrode terminals that are electrically connected to the battery cells and protrude out of the case; a bus bar, ends of which are connected to electrode terminals protruding from adjacent ones of a plurality of the battery units in such a way that the adjacent battery units are electrically connected; and a protection unit that insulates the bus bar from other elements by covering the bus bar.

According to a non-limiting aspect, the protection unit may include an insulating case having a space that accommodates the bus bar.

According to a non-limiting aspect, a connection unit may be formed between the bus bar and the protection unit to fix the protection unit to the bus bar.

According to a non-limiting aspect, the connection unit may include at least one protrusion protruding from an edge of the bus bar; and a connection hole formed in the protection unit and engaged with the protrusion.

According to a non-limiting aspect, the connection unit may include a hook portion formed on the protection unit; and an insertion hole formed in an edge of the bus bar, wherein the hook portion is inserted into the insertion hole.

According to a non-limiting aspect, the protection unit may have a size selected to simultaneously accommodate a plurality of the bus bars that are adjacent to each other.

According to a non-limiting aspect, the protection unit may include a sidewall portion disposed perpendicularly to the bus bar, and a top portion integrally formed with the sidewall portion in order to form a space that accommodates the bus bar.

According to a non-limiting aspect, a space that accommodates the bus bar may be formed in the protection unit according to a height of the sidewall portion.

According to a non-limiting aspect, a battery pack includes a plurality of battery units, each comprising a plurality of battery cells, a case providing a space for accommodating the battery cells, and a plurality of electrode terminals that are electrically connected to the battery cells and protrude out of the case; a plurality of bus bars, ends of each bus bar being connected to electrode terminals protruding from adjacent ones of a plurality of the battery units in such way that the adjacent battery units are electrically connected; and a plurality of protection units, each protection unit insulating at least one bus bar by covering the at least one bus bar Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF CERTAIN INVENTIVE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
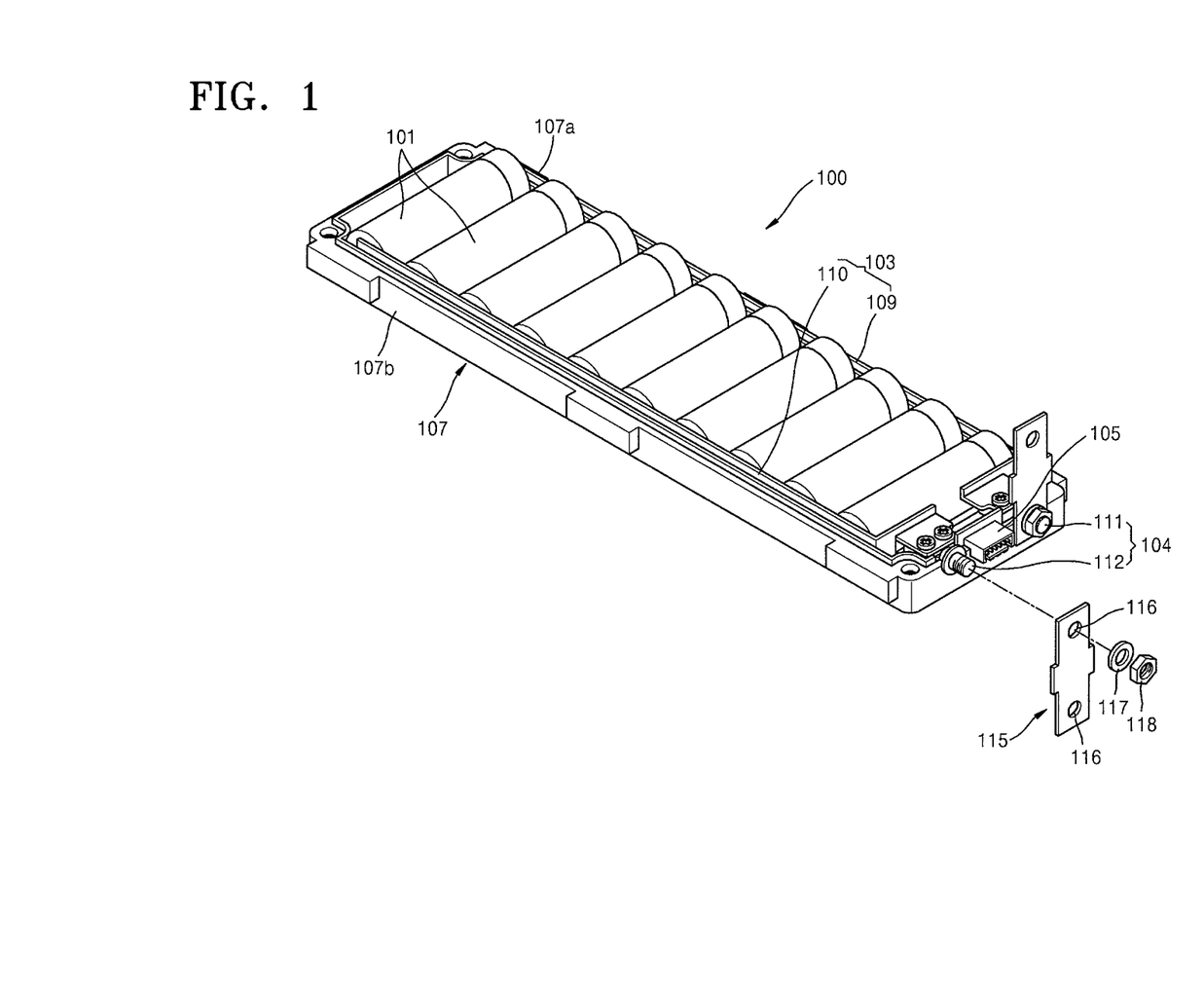
FIG. 1 is a partial perspective view of a lower case of a battery unit according to an embodiment of the present invention.
Figure 2:
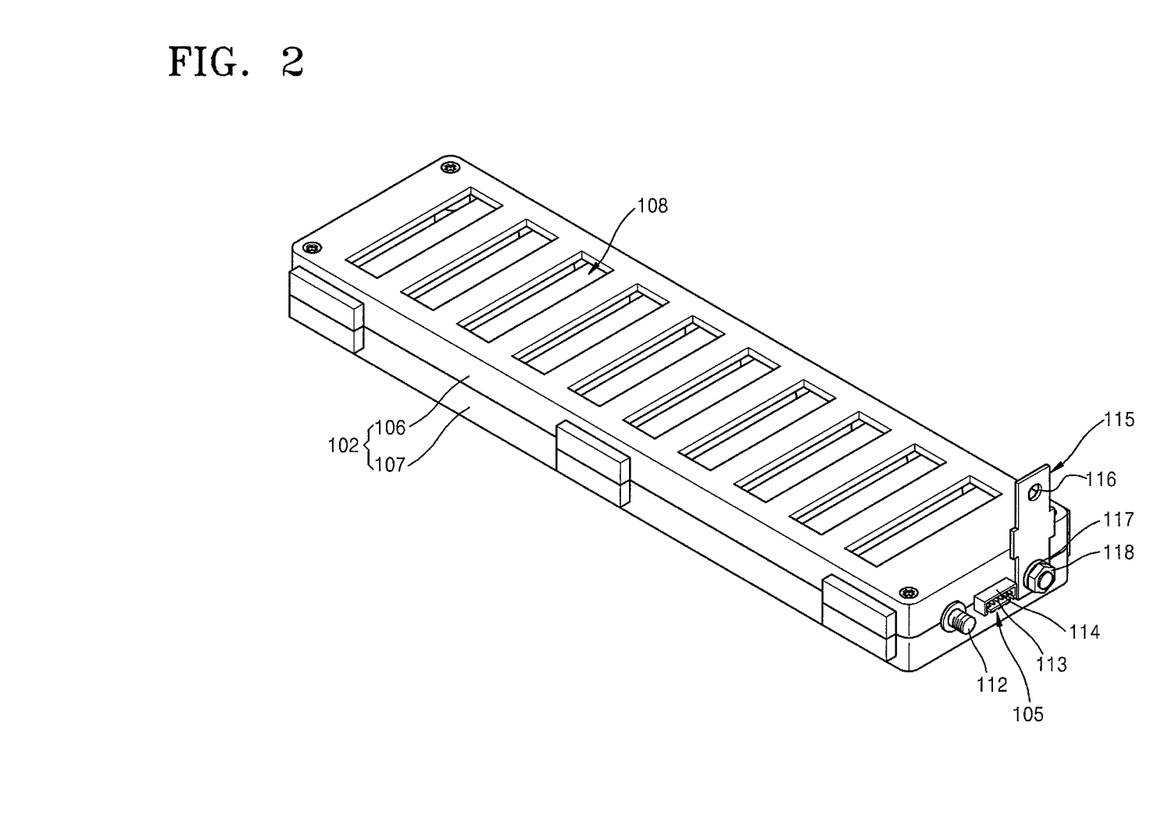
FIG. 2 is a perspective view illustrating an assembled battery unit.

FIG. 1 is a partial perspective view of a lower case 107 of a battery unit 100 according to an embodiment of the present invention. FIG. 2 is a perspective view illustrating an assembled battery unit 100.

Referring to FIGS. 1 and 2, the battery unit 100 includes a case 102 that accommodates a plurality of battery cells 101 therein, an electrode tap 103 that electrically connects the battery cells 101 to each other, electrode terminals 104 that are electrically connected to the electrode tap 103 and protrude out of the case 102, and a communication connector 105 that transmits data regarding a state of the battery cells 101, such as temperature and charging state of the battery cells 101, as an electrical signal.

According to the present embodiment, the battery cells 101 are consecutively arranged in parallel and are electrically connected to each other so that a battery unit including the battery cells 101 may have a relatively large capacity. As non-limiting examples, the battery cells 101 may be at least one selected from the group consisting of a cylindrical secondary battery, a prismatic secondary battery, and a polymer secondary battery.

The case 102 includes an upper case 106 and the lower case 107 coupled to the upper case 106. An internal space that accommodates the battery cells 101 is formed by coupling the upper case 106 and the lower case 107 to each other. A plurality of heat dissipation holes 108 are formed in the upper case 106 in order to quickly dissipate heat generated during operation of the battery cells 101.

The battery cells 101 are consecutively arranged parallel to each other in a longitudinal direction of the case 102 and are connected to each other in parallel by a first electrode tap 109 and a second electrode tap 110 (collectively referred to as electrode tap 103) that are connected to terminals having respective polarities of the battery cells 101. The first electrode tap 109 and the second electrode tap 110 are each configured as a conductive plate formed of, for example, nickel (Ni).

The first electrode tap 109 is disposed on an inner surface of a first sidewall 107a in a longitudinal direction of the lower case 107, and the second electrode tap 110 is disposed on an inner surface of a second sidewall 107b facing the first sidewall 107a.

According to the present embodiment, the battery cells 101 are connected to each other in parallel; however, the present embodiment is not limited thereto, and the battery cells 101 may be connected to each other in series or in parallel.

The electrode terminals 104 are formed on one side of the case 102. The electrode terminals 104 includes a first electrode terminal 111 that is electrically connected to the first electrode tap 109, and a second electrode terminal 112 that is electrically connected to the second electrode tap 110. The first electrode terminal 111 and the second electrode terminal 112 extend from inside the case 102 to outside the case 120.

The communication connector 105 includes a plurality of connection pins 113 installed in a connector housing 114, and is disposed on the same surface of the case 102 as where the first electrode terminal 111 and the second electrode terminal 112 are disposed. The communication connector 105 is electrically connected to a plurality of thermistor lines (not shown) and a plurality of balancing lines (not shown), and may transmit data regarding a state of the battery cells 101, such as the temperature and charging state of the battery cells 101, as an electrical signal to a controller such as a battery management system (BMS).

A bus bar 115 is installed on the first electrode terminal 111 of one battery unit 100 and the second electrode terminal 112 of an adjacent battery unit 100 (see FIG. 3) in order to electrically connect the battery units 100 to each other. The bus bar 115 is a conductive plate. The bus bar 115 includes insertion holes 116 through which the first electrode terminal 111 of one of the battery units 100 and the second electrode terminal 112 of an adjacent battery unit 100 may be inserted. The bus bar 115 is coupled to the first electrode terminal 111 and the second electrode terminal 112 by nuts 118, wherein washers 117 are interposed between the nuts 118 and the bus bar 115.

Figure 3:
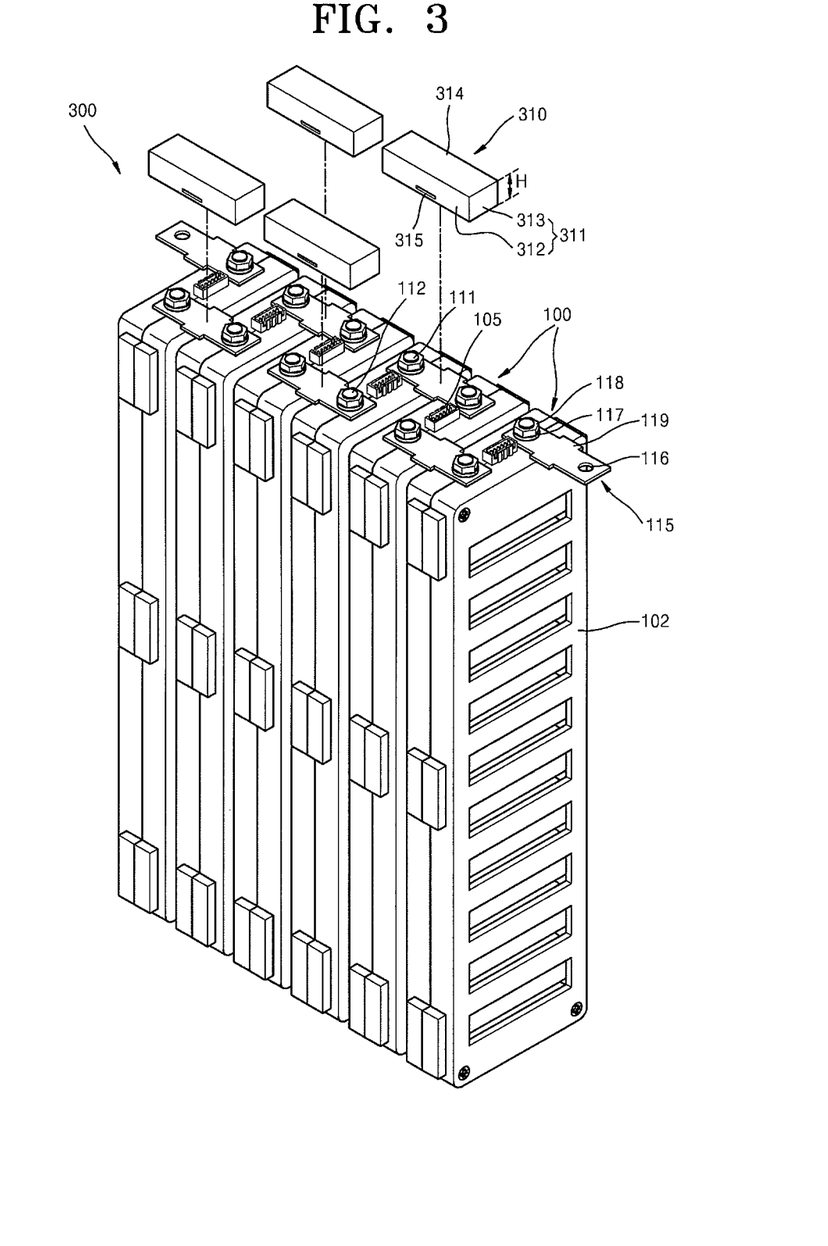
FIG. 3 is a perspective view illustrating how protection units are coupled to a battery pack, according to an embodiment of the present invention.
Figure 4:
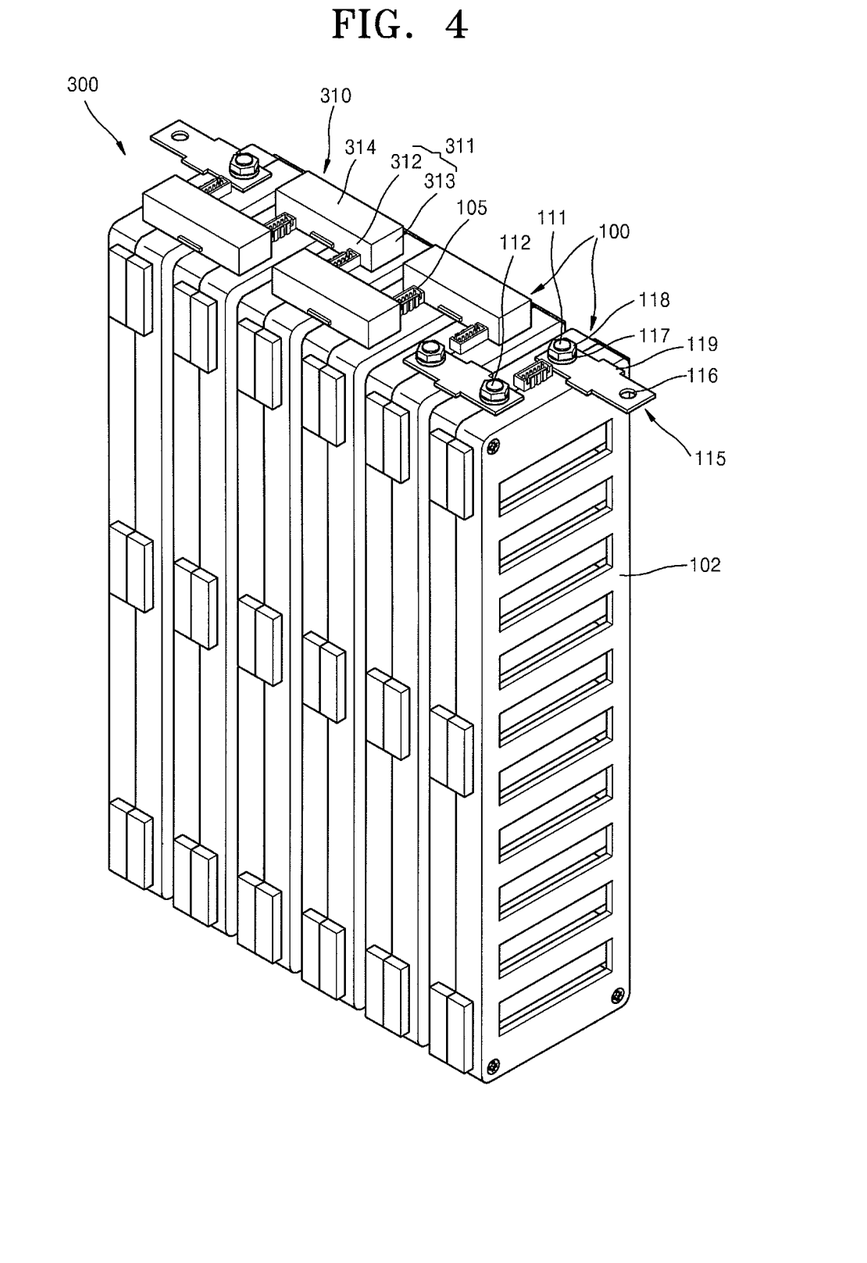
FIG. 4 is a perspective view illustrating the protection units coupled to the battery pack, according to the embodiment of FIG. 3.

FIG. 3 is a perspective view to illustrate how protection units 310 are coupled to a battery pack 300, according to an embodiment of the present invention. FIG. 4 is a perspective view illustrating a battery pack 300 to which the protection units 310 are coupled, according to an embodiment of the present invention. Like reference numerals in the drawings denote like elements.

Referring to FIGS. 3 and 4, a plurality of battery units 100 are arranged in such a way that facing polarities of the battery units 100 adjacent to each other have opposing polarities. For example, the first electrode terminal 111 of each battery unit 100 is connected to the second electrode terminal 112 of an adjacent battery unit 100 by a plurality of bus bars 115. The battery units 100 are consecutively connected to constitute the battery pack 300. The number of battery units 100 may be determined according to charging and discharging capacitances desired during product design.

The protection units 310 that cover the bus bars 115 are installed on the bus bar 115, as will now be described in more detail.

With respect to one protection unit 310 and one bus bar 115, the protection unit 310 may completely surround the bus bar 115 so as to insulate the bus bar 115 from other elements. To achieve this, the protection unit 310 may include an insulating case formed of an insulating material, such as, for example, a polymer resin.

The protection unit 310 includes a sidewall portion 311 disposed perpendicularly to the bus bar 115. The sidewall portion 311 includes a pair of first sidewalls 312 disposed in a longitudinal direction of the bus bar 115, and a pair of second sidewalls 313 disposed along a widthwise direction of the bus bar 115. The first sidewalls 312 are disposed perpendicularly to the bus bar 115 so as to respectively face both lengthwise edges of the bus bar 115. The second sidewalls 313 are disposed perpendicularly to the bus bar 115 so as to respectively face both widthwise edges of the bus bar 115. The second sidewalls 313 are integrally formed with the first sidewalls 312.

Thus, the first sidewalls 312 and the second sidewalls 313 integrally formed with each other are positioned around the bus bar 115 when the protection unit 310 is coupled to the bus bar 115.

The protection unit 310 includes a top portion 314 that is integrally formed with top edges of the sidewall portion 311 disposed perpendicularly to the bus bar 115. Since the top portion 314 is integrally formed with top edges of the first sidewalls 312 and top edges of the second sidewalls 313, an internal space to accommodate the bus bar 115 is formed according to a height 'H' of the first sidewalls 312 and the second sidewalls 313.

Thus, when the protection unit 310 is installed on the bus bar 115, according to one alternative, the bus bar 115 does not contact the top portion 314 of the protection unit 310. Alternatively, an interval between the bus bar 115 and the top portion 314 may be reduced such that the top portion 314 contacts the bus bar 115 in a surface contact manner.

In order to stably fix the protection unit 310 to the bus bar 115, the bus bar 115 and the protection unit 310 may each include connection units.

That is, connection holes 315 are formed in the first sidewalls 312. The connection holes 315 are formed in lower intermediate portions of the first sidewalls 312. The connection holes 315 may be formed not only in the first sidewalls 312, but also in the second sidewalls 313, or may only be formed in the second sidewalls 313. Any configuration that provides connection holes 315 formed in the protection unit 310 may be used.

The bus bar 115 includes protrusions 119 that protrude from edges of the bus bar 115 by a predetermined length along the longitudinal direction of the bus bar 115. The protrusions 119 are formed so as to engage the connection holes 315.

In the battery pack 300 having the above-described structure, the battery units 100 are arranged parallel to each other in a consecutive order such that, for example, the first electrode terminal 111 of one battery unit 100 and the second electrode terminal 112 of an adjacent battery unit 100 are inserted into insertion holes 116 of the bus bar 115, the nuts 118 are engaged with the first electrode terminal 111 and the second electrode terminal 112, wherein the washers 117 are interposed between the nuts 18 and the bus bar 115, and thus the battery units 100 that are adjacent to each other are electrically connected to each other.

Then, the protection unit 310 is installed on the bus bar 115.

That is, the first sidewalls 312 and the second sidewalls 313, which are disposed perpendicular to the bus bar 115, are positioned around the bus bar 115. According to one alternative, an space is formed between the surface of the bus bar 115 and the top portion 314. Alternatively, the top portion 314 may contact the surface of the bus bar 115 in a surface contact manner. The bus bar 115 is accommodated in the space of the protection unit 310 formed according to the height 'H' of the first sidewalls 312 and the second sidewalls 313.

When the bus bar 115 is accommodated in the protection unit 310, the protrusions 119 protruding along the lengthwise edges of the bus bar 115 are inserted into the connection holes 315 formed in the first sidewalls 312.

Thus, the protection unit 310 may be strongly fixed to the bus bar 115.

Figure 5:
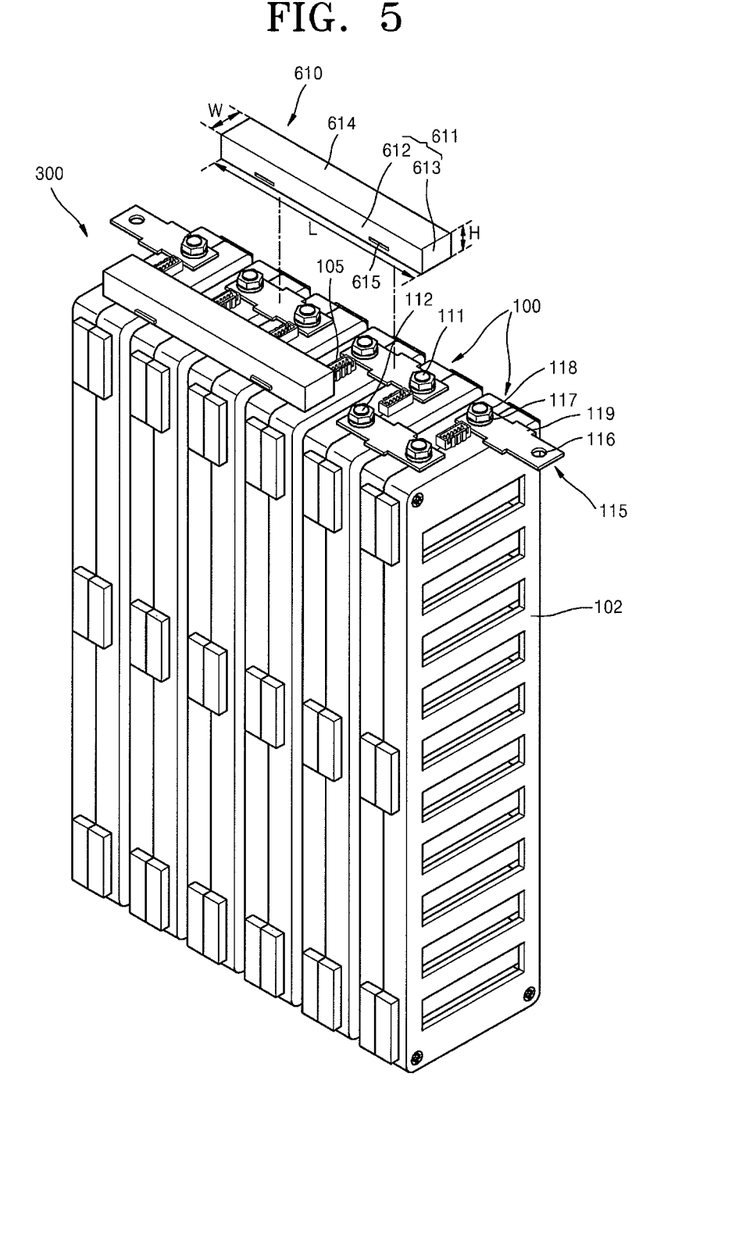
FIG. 5 is a perspective view illustrating protection units installed on a battery pack, according to another embodiment of the present invention.

FIG. 5 is a perspective view illustrating another embodiment of the present invention, in which protection units 610, as further described, are installed on the battery pack 300.

Referring to FIG. 5, the battery pack 300 includes a plurality of battery units 100 consecutively arranged. The communication connector 105, the first electrode terminal 111, and the second electrode terminal 112 protrude from one side of the case 102 of each of the battery units 100. The battery units 100 that are adjacent to each other are electrically connected to each other by a plurality of bus bars 115.

The protection units 610 are installed on a plurality of the bus bars 115 in order to insulate the bus bars 115 from other elements. To achieve this, the protection units 610 may include an insulating case formed of an insulating material, for example, a polymer resin.

The protection units 610 each has a size selected such that a single protection unit 610 simultaneously accommodates a plurality of the bus bars 115 that are adjacent to each other. For example, each of the protection units 610 has a proper size so as to simultaneously accommodate one bus bar 115 for electrically connecting a pair of adjacent battery units 100 and another bus bar 115 for electrically connecting the battery unit 100 to one of the pair of adjacent battery units 100.

With respect to one protection unit 610, the protection unit 610 includes a sidewall portion 611 disposed perpendicularly to the bus bars 115. The sidewall portion 611 includes a pair of first sidewalls 612 that face each other and that are disposed in a longitudinal direction of the bus bars 115, and a pair of second sidewalls 613 that face each other and that are disposed in a widthwise direction of the bus bars 115. A length 'L' of the first sidewalls 612 is greater than a total length of a pair of the bus bars 115 that are adjacent to each other, and a width 'W' of the second sidewalls 613 is greater than a width of one bus bar 115.

The protection unit 610 includes a top portion 614 that is integrally formed with top edges of the sidewall portion 611. Since the top portion 614 is integrally formed with top edges of the first sidewalls 612 and top edges of the second sidewalls 613, an internal space for accommodating the bus bars 115 is formed according to a height 'H' of the first sidewalls 612 and the second sidewalls 613.

According to one alternative, when the protection unit 610 is installed on the bus bars 115, the bus bars 115 do not contact the top portion 614. Alternatively, the top portion 614 may contact the bus bars 115 without thermal bonding.

A plurality of connection holes 615 are formed in the first sidewalls 612. The connection holes 615 are formed in a lower portion of the first sidewalls 612. The bus bars 115 include protrusions 119 that protrude from edges of the bus bars 115 by a predetermined length along a longitudinal direction of the bus bars 115 and are formed so as to engage the connection holes 615.

In the protection unit 610 having the above-described structure, the first sidewalls 612 and the second sidewalls 613, which are perpendicular to the bus bars 115s, are positioned around the bus bars 115.

When a pair of the bus bars 115 is accommodated in the protection unit 610, the protrusions 119 protruding along a longitudinal direction of the bus bars 115 are inserted into the connection holes 615 formed in the first sidewalls 612.

Thus, the pair of bus bars 115 is simultaneously accommodated in the protection unit 610, and the protection unit 610 may be strongly fixed to the pair of bus bars 115.

Figure 6:
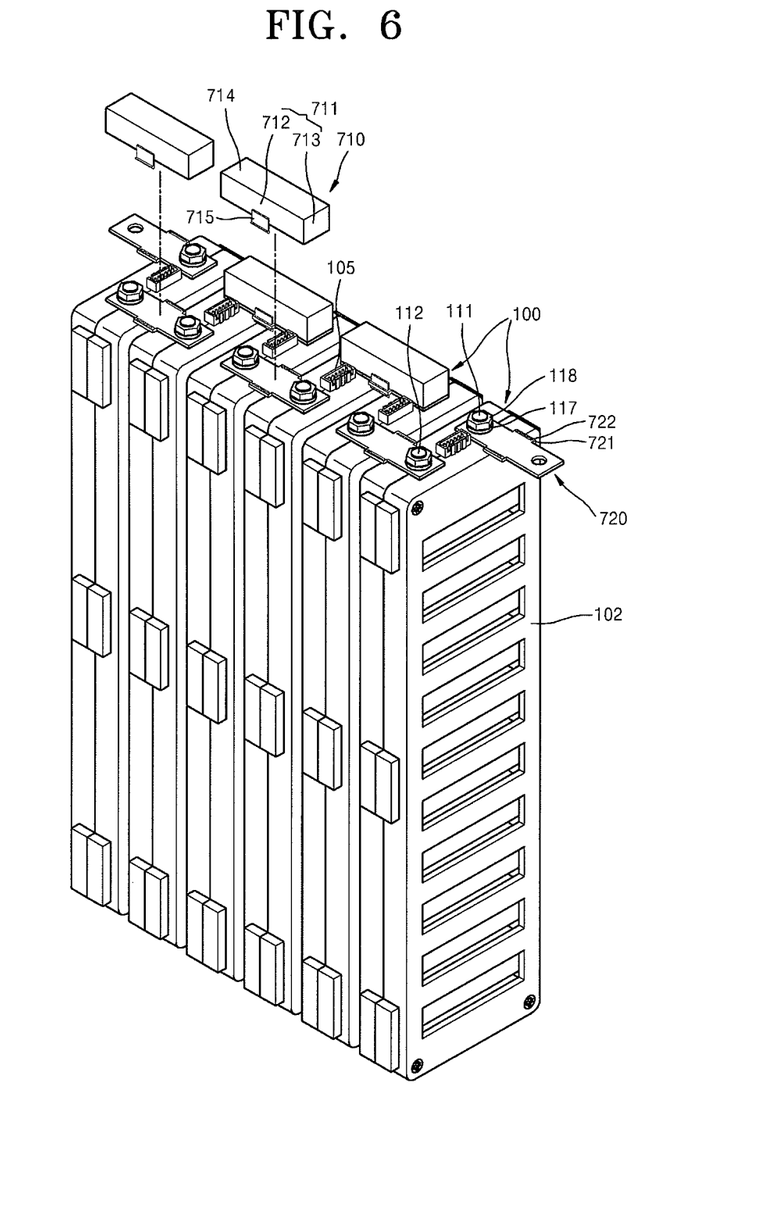
FIG. 6 is a perspective view illustrating protection units installed on a battery pack, according to another embodiment of the present invention.

FIG. 6 is a perspective view illustrating another embodiment of the present invention, in which protection units 710, as further described, are installed on the battery pack 300.

Referring to FIG. 6, the battery pack 300 includes a plurality of the battery units 100 that are consecutively arranged and are electrically connected to each other by bus bars 720.

The protection units 710 are installed on the bus bars 720 in order to insulate the bus bars 720 from other elements. The bus bars 720 are formed of an insulating material used for forming an insulating case. The protection units 710 have a proper size so as to accommodate the bus bars 720.

The protection units 710 each include a sidewall portion 711 perpendicular to the bus bars 720. The sidewall portions 711 each include a pair of first sidewalls 712 disposed in a longitudinal direction of the bus bars 720 and facing each other, and a pair of second sidewalls 713 disposed in a widthwise direction of the bus bar 720 and facing each other.

The protection units 710 each includes a top portion 714 that is integrally formed with top edges of the sidewall portions 711. Since the top portions 714 are integrally formed with top edges of the first sidewalls 712 and the second sidewalls 713, internal spaces for accommodating the bus bars 720 are formed.

According to the embodiment of FIG. 7, the first sidewalls 712 each include a hook portion 715. The hook portions 715 are formed on lower intermediate portions of the first sidewalls 712. Lower portions of the hook portions 715 protrude downwards. The hook portions 715 may be formed not only on the first sidewalls 712, but also on the second sidewalls 713, or may be formed only on the second sidewalls 713. Any of various configurations in which the hook portions 715 are formed on the protection units 710 may be used.

The bus bars 720 include protrusions 721. The protrusions 721 protrude from edges of the bus bars 720 by a predetermined length along a longitudinal direction of the bus bars 720. Insertion holes 722 though which the hook portions 715 are inserted are formed in the protrusions 720. As an alternative, the insertion holes 722 may be formed directly in the bus bars 720 without the protrusions 721 such that the hook portions 715 are inserted into the insertion holes 722 formed in the bus bars 720.

In the protection units 710 having the above-described structure, the pairs of first sidewalls 712 and the pairs of second sidewalls 713, which are disposed perpendicular to the bus bars 720, are positioned around the bus bars 720.

When the bus bars 720 are accommodated in the protection units 710, the hook portions 715 formed on the first sidewalls 712 are inserted into the insertion hole 722 formed along a lengthwise edge of the bus bars 720 in a longitudinal direction of the bus bar 720. Thus, the protection units 710 may be strongly fixed to the bus bars 720.

As described above, according to the one or more of the above embodiments of the present invention, a battery pack may have effects described below.

Short circuits may be prevented by surrounding a bus bar of a battery pack with an insulating protection unit.

Electrical accidents due to negligence may be prevented due to the insulating protection unit by preventing a user from directly contacting the bus bar of the battery pack accidentally.

In order to replace the bus bar, the insulating protection unit may be detached from the bus bar and then installed on the bus bar without needing to cut the insulating protection unit or manufacture another insulating protection unit.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A battery pack comprising:
 a plurality of battery units, each comprising a plurality of battery cells, a case providing a space for accommodating the battery cells, and a plurality of electrode screw post terminals that are electrically connected to the battery cells and protrude out of the case;
 a unitary bus bar having thin side edges, ends of which are connected to electrode screw post terminals protruding from adjacent ones of a plurality of the battery units in such way that the adjacent battery units are electrically connected; and the ends of the bus bar are held in place on the screw post terminals by one or more nuts, wherein the bus bar is a single conductive plate and is screwed to the electrode terminals of the adjacent ones of the plurality of battery units; and
 a protection unit that insulates the bus bar by covering the bus bar and by completely covering the electrode terminals connected by the bus bar, wherein a connection unit is formed between the bus bar and the protection unit to fix the protection unit to the bus bar, and wherein the connection unit comprises:
 at least one protrusion integral to and protruding from an edge of the bus bar; and
 a connection hole formed in the protection unit and engaged with the protrusion.

2. The battery pack of claim 1, wherein the protection unit comprises an insulating case having a space that accommodates the bus bar.

3. The battery pack of claim 1, wherein the connection unit comprises:
 a hook portion formed on the protection unit; and
 an insertion hole formed in an edge of the bus bar, wherein the hook portion is inserted into the insertion hole.

4. The battery pack of claim 1, wherein the battery pack comprises a plurality of bus bars, each bus bar electrically connecting one electrode terminal protruding from a first battery unit of the adjacent ones of the battery units to one electrode terminal protruding from a second battery unit of the adjacent ones of the battery units and wherein the battery pack comprises a plurality of protection units, each protection unit insulating at least one bus bar of the plurality of bus bars by covering the at least one bus bar and wherein each protection unit comprises an insulating case having a space that accommodates the at least one bus bar.

5. The battery pack of claim 4, wherein the protection unit has a size selected to simultaneously accommodate a plurality of the bus bars that are adjacent to each other.

6. The battery pack of claim 1, wherein the protection unit is formed of an insulating material.

7. The battery pack of claim 6, wherein the protection unit comprises a sidewall portion disposed perpendicularly to the bus bar, and a top portion integrally formed with the sidewall portion in order to form a space that accommodates the bus bar.

8. The battery pack of claim 7, wherein at least one protrusion protrudes from an edge of the bus bar, and
 wherein a connection hole that engages with the protrusion is formed in the sidewall portion.

9. The battery pack of claim 7, wherein a least one insertion hole is formed in the bus bar, and
 wherein a hook portion that inserts into the insertion hole is formed on the sidewall portion.

10. The battery pack of claim 7, wherein a space that accommodates the bus bar is formed in the protection unit according to a height of the sidewall portion.

11. The battery pack of claim 1, wherein the bus bar electrically connects one electrode terminal protruding from a first battery unit of the adjacent ones of the battery units to one electrode terminal protruding from a second battery unit of the adjacent ones of the battery units.

12. The battery pack of claim 4, wherein the protection unit has a size selected to simultaneously accommodate a plurality of the bus bars.

13. The battery pack of claim 1, wherein the plurality of battery cells are electrically connected by an electrode tap, and
 wherein the electrode tap is electrically connected to the electrode terminals.

14. A battery pack comprising:
 a plurality of battery units, each comprising a plurality of battery cells, a case providing a space for accommodating the battery cells, and a plurality of screw post electrode terminals that are electrically connected to the battery cells and protrude out of the case;

a plurality of unitary bus bars, ends of each bus bar being connected to electrode screw post terminals protruding from adjacent ones of a plurality of the battery units in such way that the adjacent battery units are electrically connected, and the ends of each bus bar are held in place on the screw post terminals by one or more nuts, wherein at least one of the plurality of bus bars is a single conductive plate and is screwed to the electrode terminals of the adjacent ones of the plurality of battery units; and a plurality of protection units, each protection unit insulating at least one bus bar by covering the at least one bus bar and by completely covering the electrode terminals connected by the bus bar, wherein a connection unit is formed between each of the plurality of bus bars and the protection units to fix each of the plurality of protection units to a corresponding bus bar, and wherein the connection unit comprises:

at least one protrusion integral to and protruding from an edge of the bus bar; and a connection hole formed in the protection unit and engaged with the protrusion.

* * * * *